Jan. 23, 1934.   R. K. LEE ET AL   1,944,248
MOTOR MOUNTING
Filed Feb. 26, 1932   3 Sheets-Sheet 1

INVENTORS.
ROGER K. LEE AND
CARROLL L. HUMPHREY.
BY
ATTORNEY.

INVENTORS.
ROGER K. LEE AND
CARROLL L. HUMPHREY.
BY
ATTORNEY.

Jan. 23, 1934.　　R. K. LEE ET AL　　1,944,248

MOTOR MOUNTING

Filed Feb. 26, 1932　　3 Sheets-Sheet 3

INVENTORS.
ROGER K. LEE AND
CARROLL L. HUMPHREY.
BY
　　ATTORNEY.

Patented Jan. 23, 1934

1,944,248

UNITED STATES PATENT OFFICE 1,944,248

MOTOR MOUNTING

Roger K. Lee and Carroll L. Humphrey, Highland Park, Mich., assignors to Chrysler Corporation, Detroit, Mich., a corporation of Delaware Application February 26, 1932. Serial No. 595,356

40 Claims. (Cl. 248—14.2)

Our invention relates to an improved type and arrangement of supporting devices for reciprocating piston type engines, such as internal combustion engines for use in propelling vehicles, and it has particular relation to a novel form and arrangement of engine mounting members which permits of a limited amount of movement of the engine.

More specifically, our invention provides a means of supporting an engine of the reciprocating piston type in such manner that the engine may oscillate, under the influence of the torque reaction impulses, about a predetermined axis passing approximately through the center of mass of the engine, or engine assembly.

In certain installations of this character the engine supports have been disposed one at each end of the engine assembly, in which structures the engine assembly supports its own weight very much in the manner of a beam supported at each end. This type of support necessitates that the engine block and crankcase, together with any other parts, such as the clutch and transmission housings, that may be fixedly secured thereto, be of sufficient rigidity to prevent flexure of the engine assembly caused either by the weight of the structure or by any forces of any sort set up therein during operation of the engine.

Obviously, as the length of the engine or engine assembly or the number of cylinders with their associated moving parts is increased, the weight and forces tending to cause flexure of the engine assembly intermediate the supports increase which, in turn, requires that the rigidly associated parts be made correspondingly stronger throughout the length of the engine assembly to prevent fixtures thereof. However, the necessary increase in strength cannot be obtained without an undesirable and otherwise unnecessary increase in weight, which necessitates the employment of stronger engine supports, both of which increase the cost of the engine assembly and the weight of the vehicle without producing any corresponding increase in power.

By our invention we have not only eliminated the aforementioned disadvantage but have substituted certain advantages therefor. In so doing, we have provided a means disposed intermediate the ends of the engine which supports a considerable portion, or all, of the weight of the engine assembly without interfering with the desired resiliently restrained oscillation thereof. Such arrangement reduces the tendency for flexure by reducing the length of the span between supports and eliminates the added weight necessary to secure rigidity of the engine assembly without in any way affecting the power of the engine, thus providing a lighter and less expensive vehicle possessing the same amount of power.

Furthermore, by supporting the major part of the weight of the engine on the intermediate mounting, which lends itself to sturdy construction, either one or both of the end supports or bearing members may be relieved of any part or all of the engine weight, thus permitting the use of end supports or mountings of comparatively light weight and inexpensive construction. When one of these end mountings is entirely relieved of the weight of the engine, as is our preferred form of construction, this mounting may be made in the form of a guide, rather than a support, to prevent lateral and longitudinal displacement of the engine and still permit the desired freedom of oscillatory movement.

One main object of our invention consists in providing a mounting for oscillatively supporting an engine of the character indicated on an axis which extends substantially through the center of mass of the engine so as to prevent displacement of the center of mass during oscillation of the engine under the influence of the torque reaction impulses.

Another object is to provide a mounting of this character which supports the weight of the engine at locations that are spaced apart substantially less than the entire length of the engine so as to prevent longitudinal deflection of the central part of the engine and to permit of the use of parts which are lighter in weight.

A further object of our invention is to provide a yieldable weight supporting member at one end of the engine and another between the ends of the engine which allow substantially free oscillation of the engine within a predetermined range of movement, and to provide means at the other end of the engine for limiting transverse movement thereof and which does not interfere with the natural tendency of the engine to oscillate about an axis extending substantially through its center of mass.

An additional object consists in providing a mounting at the front of the engine which establishes the front end of the axis in a plane higher than the center of mass so that the axis of oscillation defined by these two centers passes within close proximity of the center line of the crankshaft at the rear end of the engine during oscillation of the engine under the influence of the torque reaction impulses.

A further object is to provide rubber elements in the engine mounting members which constitute yieldable weight supporting members, some of which are fixed to the engine and its supporting frame, respectively, for controlling the natural frequency of the engine on its mounting so as to produce a natural frequency of a low order which will not synchronize with the torque reaction impulses within the driving range of the engine, and to provide a torque arm between the engine and its supporting frame for cooperating with the rubber of the engine mounting members in predetermining the natural vibration frequency of the engine on its mountings.

An illustrative embodiment of the invention is shown in the accompanying drawings, in which.

Figure 1:
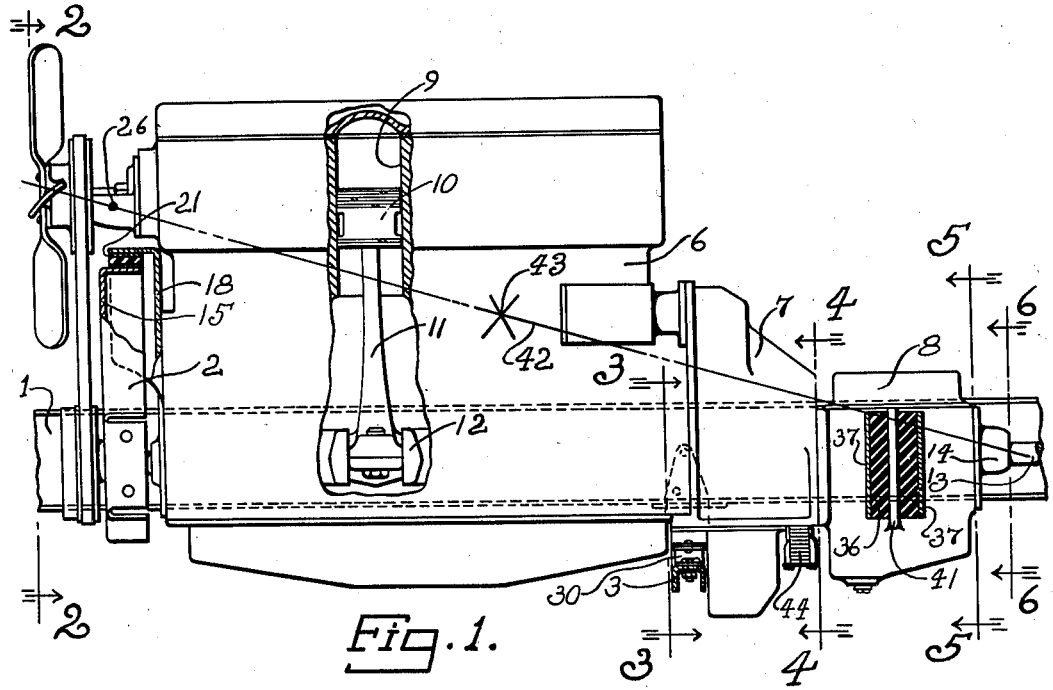
Fig. 1 is a side view, partially in elevation and partially in section, of an internal combustion engine mounted according to our invention in a chassis frame of a vehicle.

In the forms shown, the improved internal combustion engine mounting is illustrated in conjunction with a vehicle chassis frame which includes longitudinally extending channel members 1 and rigid transversely disposed front and rear members 2 and 3, respectively, which are secured to the longitudinal channel members by means of brackets 4 and 5, respectively. The transverse frame member 2 is located at the front end of the vehicle chassis frame and the transverse member 3 is spaced rearwardly therefrom a distance slightly greater than the length of the crankcase 6 of the engine. The crankcase 6 is received between the longitudinal channel members 1, and the clutch and transmission housings 7 and 8, respectively, are rigidly fixed together and to the crankcase and are longitudinally aligned therewith.

The internal combustion engine is of the multiple cylinder type, having for the purposes of illustration, six aligned cylinders 9, only one of which is shown. Slidably mounted in each cylinder is a reciprocating piston 10 to which is pivotally attached a connecting rod 11, which is journaled at its lower end on a crankshaft 12 in the usual manner. A clutch mechanism (not shown) within the housing 7 connects the crankshaft 12 with a transmission mechanism (not shown) within the housing 8 in a conventional manner and the transmission mechanism in turn drives a propeller shaft 13 through a universal or other flexible joint 14.

Figure 2:
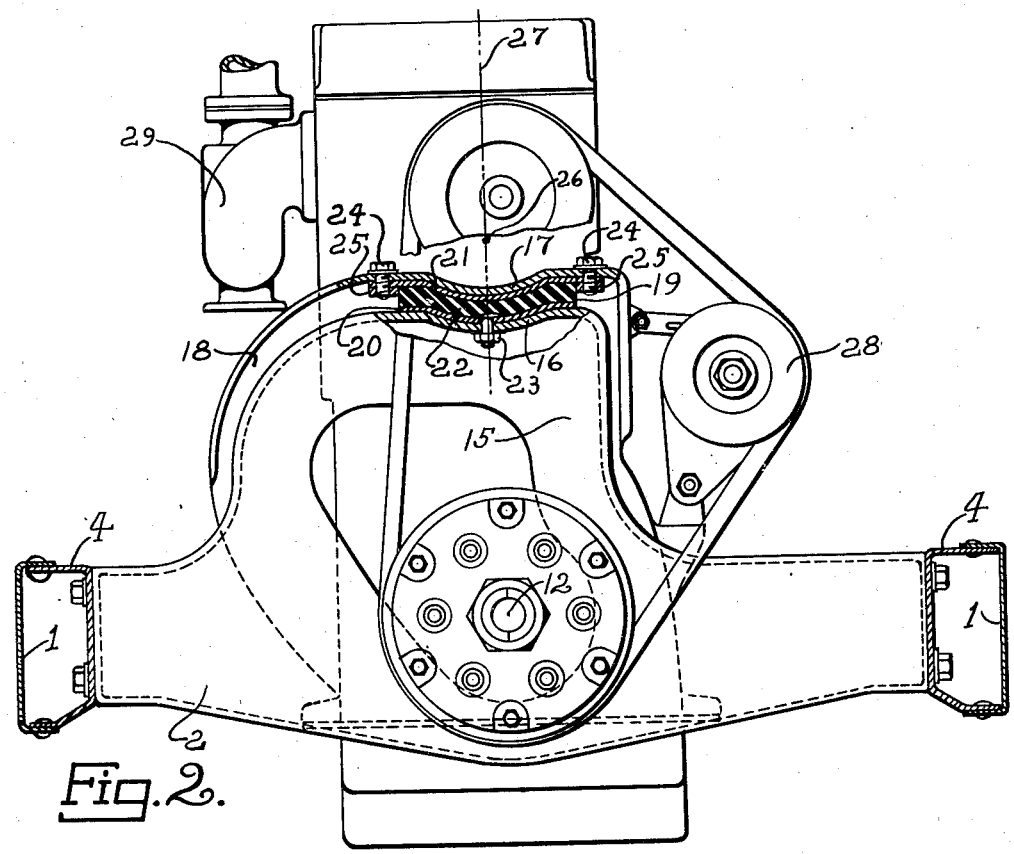
Fig. 2 is a transverse sectional view taken on the line 2—2 of Fig. 1.

The transverse member 2 of the frame structure has an upstanding intermediate portion 15, as best shown in Fig. 2, on which is formed an arcuate shaped portion 16 which forms a support for and registers with a correspondingly shaped member 17 constituting a portion of an upstanding bracket 18, which is fixed on the front end of the crankcase 6. Disposed intermediate the arcuate shaped portions 16 and 17 is a support 19 which includes a pair of metallic plates 20 and 21, having correspondingly shaped arcuate portions which register with and substantially conform to the curvature of the arcuate members 16 and 17, and a rubber element 22 disposed between the plates 20 and 21 and rigidly fixed to the adjacent faces thereof, preferably by vulcanization. The lower plate 20 is secured to the arcuate portion 16 of the cross member 2 by means of a bolt 23 and the upper plate 21 is secured to the bracket 18 by bolts 24 which extend through registering openings in the bracket 18 and in ears 25 on the ends of the plate 21.

The rubber connection between the plates 20 and 21 permits the latter to oscillate relative to the transverse frame member 2 about a substantially definite point designated by the numeral 26 and preferably located in a vertical plane 27 in which the center of mass of the engine lies. As shown, this vertical plane is offset somewhat to the left of the vertical plane containing the axis of the crankshaft 12. The location of this vertical plane may, however, vary within substantially wide limits in various engines, depending upon the distribution of the weight of the parts thereof, such as the generator 28, manifold 29, and diverse other auxiliary structures. The curvature of the plates 20 and 21 holds the front part of the engine against transverse movement, and, together with the thickness and character of the rubber 22, predetermines the location of the point 26 about which the plate 21 is free to oscillate. As the plate 21 is fixed to the engine, the structure of the front support 19 establishes one of the points that determine the axis about which the engine may oscillate.

Figure 3:
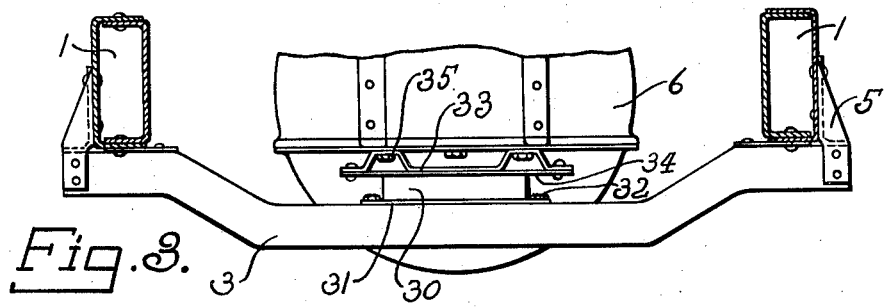
Fig. 3 is a transverse sectional view taken on the line 3—3 of Fig. 1.

The front mounting 19 supports the weight of the front end of the engine and, preferably, the entire remaining weight of the engine is supported by a rubber block 30, as best shown in Fig. 3, fixed to a metal plate 31, preferably by vulcanization, which is secured to the transverse frame member 3 by bolts 32 disposed at the ends thereof. The rubber block 30 registers with and engages a metallic bracket 33 having a substantially flat lower face 34 and which is secured on the end of the crankcase 6 by bolts 35. The rubber block 30 may, if desired, be fixed to the flat face 34 of the bracket 33 or to the plate 31, or may be fixed to both of these members, depending on the characteristics desired therein. Also, if desired, the block 30 may be fixedly secured to one of the members 31 or 33 and may slidably engage the other. By providing a support of this character at the rear end of the crankcase 6, or some otherwise suitably located position intermediate the ends of the engine, the occurrence of a long span between the front and rearward supports is avoided and the necessity for adding additional thickness to the various parts to secure rigidity is eliminated. As a result, the structure between the points of support readily resists deflection which, if permitted in an engine mounted so as to permit oscillation, would set up objectionable unbalanced forces or vibration periods. By locating both of the weight supporting members in advance of the clutch housing, which usually is a thin wall shell-like structure, any tendency towards deflection of the structure between the supports is eliminated. This type of mounting may be advantageously used for supporting engines of any number of cylinders, and it is particularly suitable for supporting four, six, and eight cylinder engines in which all of the cylinders are disposed in alignment.

Figure 5:
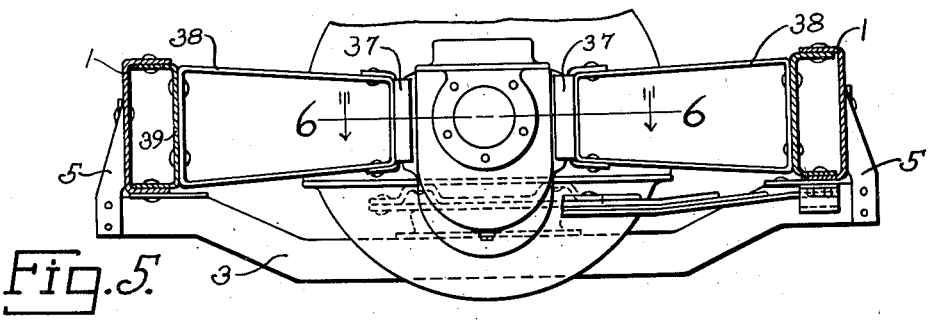
Fig. 5 is a transverse sectional view taken on the line 5—5 of Fig. 1.
Figure 6:
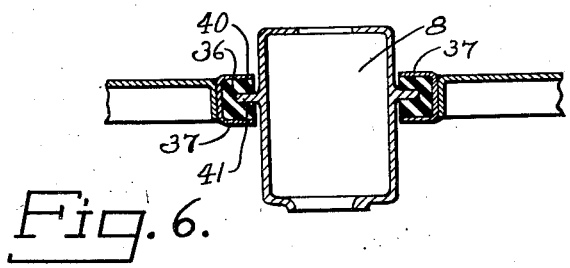
Fig. 6 is a fragmentary horizontal sectional view taken on the line 6—6 of Fig. 5.

The rear end of the engine is held against both transverse and longitudinal movement by vertically arranged channel shaped rubber blocks 36, as best shown in Figs. 5 and 6, carried by similarly shaped brackets 37, which are mounted on the ends of outwardly extending arms 38, and which, in turn, are secured at their outer ends to the channel members 1 by means of brackets 39. The rubber blocks 36 are preferably bonded by vulcanization to the brackets 37 and are each provided with a vertically extending groove 40 in which is received one of a pair of ribs 41 formed on the respectively opposite sides of the transmission housing 8. The rubber blocks 36 sustain none of the weight of the engine. They merely limit longtiudinal and transverse movement of the rear end portion of the engine assembly.

The substantially fixed point 26, established by the oscillatable support 19, constitutes one point on the axis about which the engine tends to oscillate under the influence of the torque reaction impulses resulting from operation of the engine. The rubber block 30 of the rearward mounting is adapted to permit oscillation of the engine about an axis 42, illustrated in Fig. 1, and determined by the center 26 and the center of mass 43 of the engine. The rubber block 30 is located at a considerable distance from this axis and, in addition to supporting a considerable portion of the weight of the engine, may be constructed to offer any desired force to resiliently restrain the lower part of the engine from turning about the axis 42.

The oscillatable support 19 is so disposed with respect to the engine assembly that a natural axis of oscillation thereof, passing substantially through the center of mass and in close proximity to the axis of the crankshaft at the rear end of the transmission mechanism where the universal joint is located, will pass approximately through the center of oscillation thereof, as indicated at 26 in Fig. 1. As the universal joint is in a plane of a lower horizontal level than the center of mass of the engine assembly, this requires that the center 26 be disposed in a higher horizontal plane than the center of mass. By this arrangement the engine assembly is permitted to oscillate about its natural axis of oscillation with the members 19 and 30 serving to prevent any material departure therefrom.

The natural vibration frequency of the engine upon its mountings is influenced by the characteristics of the rubber in the front and rearward mountings and by the characteristics of the rubber of the guiding blocks 36. As these rubber elements are called upon to accomplish definite functions, such as supporting of the weight of the engine and limiting its movement within a predetermined desired range, respectively, they cannot also always be provided with those properties which are required to bring the natural vibration frequency below the frequency of the torque reaction impulses at the lower end of the driving range of the engine. When this condition exists, the natural vibration frequency of the engine is predetermined by allowing a resilient member to coact between the engine and the chassis frame.

Figure 4:
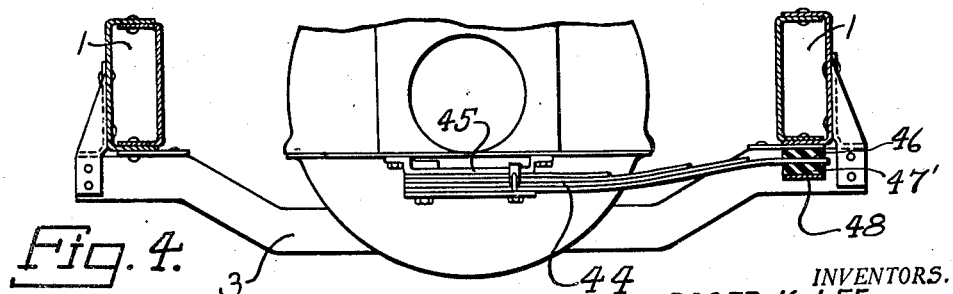
Fig. 4 is a transverse sectional view taken on the line 4—4 of Fig. 1.

In the illustration shown, a leaf spring 44, as best shown in Fig. 4, is fixed to the lower side of the clutch housing 7 by means of a bracket 45.

The leaves of the spring are arranged so as to build up greater resistance to clockwise rotation of the engine, as viewed in Fig. 4, than to counterclockwise rotation thereof, as the torque impulses tend to rotate the engine in a clockwise direction. The outer end of the leaf spring 44 is received in a slot 46 in a rubber block 47 secured to the chassis frame by means of a bracket 48, to which the rubber block is preferably bonded by vulcanization.

With a mounting of this character, the axis about which the engine oscillates may be accurately predetermined so as to extend substantially through the center of mass of the engine and through a location within close proximity of the univseral joint by which power is transmitted from the engine to the propeller shaft of a vehicle. All of the advantages of avoiding displacement of the center of mass of the engine in response to the torque reaction impulses, such as the elimination of objectionable sidesway of the chassis frame and application of transversely directed shock thereon, are thus obtained regardless of the length and rigidity of the engine assembly.

Figure 7:
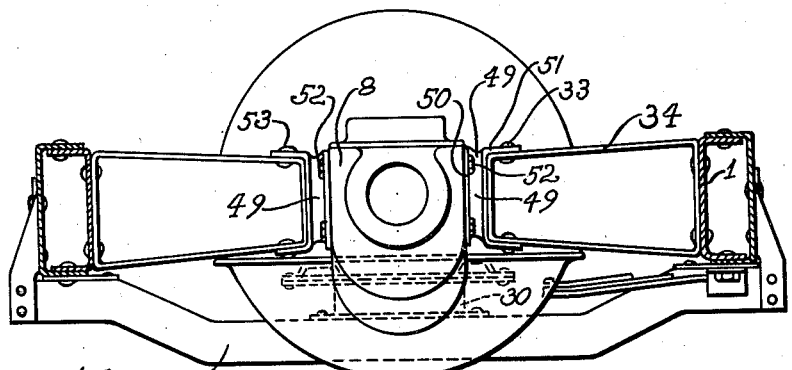
Fig. 7 is a transverse sectional view, similar to Fig. 5, taken at the rear end of the transmission housing of an engine and showing a modified form of my invention.

In the form shown in Fig. 7, the internal combustion engine is supported at its front end and at a location intermediate its front and rear ends in a manner identical with that shown in Figs. 1 to 4, inclusive. The rear end of the engine is, however, held against transverse movement by rubber blocks 49, each of which is fixed, preferably by vulcanization, to opposed faces of a plate 50 and a bracket 51, respectively. The plates 50 are secured by bolts 52 to the opposite sides of the transmission housing 8, and the brackets 51 are secured by rivets 53 to outwardly extending arms 54, the opposite ends of which are secured to the channel members 1 of the chassis frame. The rubber blocks 49 are preferably placed under tension so as to urge the rear end of the engine downwardly upon the rubber block 30 of the rearward support. In this manner, the application of any part of the weight of the engine upon the rubber blocks 49 is positively precluded and rebounding of the rear end of the engine is effectively checked.

Figure 8:
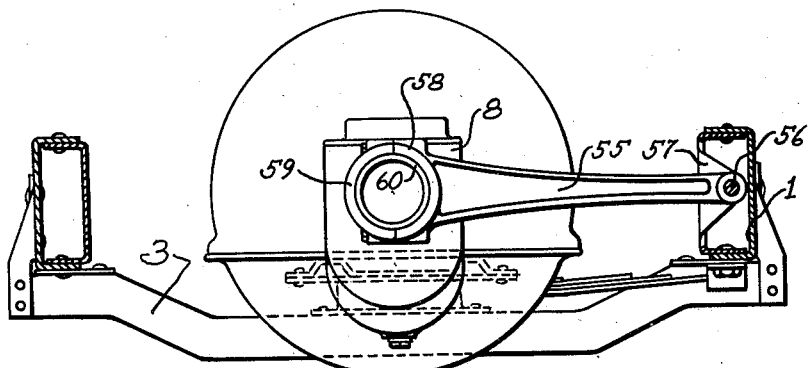
Fig. 8 is a transverse sectional view taken at substantially the same location on an engine as Figs. 5 and 7 and illustrating an additional modification of the engine mounting or guide.

In the structure shown in Fig. 8, transverse movement of the rear end of the engine is limited by a connecting rod element 55 having one end pivoted at 56 on a bracket 57 carried by the channel member 1 of the chassis frame. The opposite end of the rod 55 is journaled on a trunnion 60, formed on the rear extremity of the transmission housing 8, by means of a yoke 58 and cooperating cap 59. The connecting rod element 55 permits free vertical movement of the engine but effectively holds the rear end of the engine against transverse movement other than that incident to rotation of the element 55 about the pivot 56, which, due to the length of the element 55, is slight or substantially negligible.

It is to be understood that this invention is concerned with the oscillatory movement of the engine and all parts so attached thereto as to oscillate as a unit, and that when we refer to the "engine" or "engine assembly", we refer to parts which are mounted on the motor or engine proper so as to oscillate as a unit therewith. Although we have herein shown and described an engine which includes a main clutch and a transmission, it will be readily understood that such structure may be omitted or separately mounted, and that such omission or separate mounting merely changes the center of mass of the engine to oscillate about an axis extending through its center of mass.

Although but several specific embodiments of our invention are herein shown and described, it will be understood that various changes in the size, shape, and arrangement of parts may be made without departing from the spirit of our invention, and it is not our intention to limit its scope other than by the terms of the appended claims.

What we claim is:

1. A mounting for an internal combustion engine assembly including a frame structure, means on said frame structure sustaining substantially the entire weight of said engine assembly and oscillatively supporting the latter, said means including yieldable supports located at one end of said engine assembly and intermediate the ends thereof respectively, and means coacting with the other end of said engine assembly substantially free from the weight thereof for limiting transverse movement of the latter end of said engine assembly.

2. A mounting for an internal combustion engine including a frame structure, a pair of yieldable supports on said frame structure sustaining substantially the entire weight of said engine and oscillatively supporting the latter on an axis extending substantially through its center of mass, one support being located at one end of said engine and the other located intermediate the ends thereof, at least one of said supports having a rubber element fixed to said engine and frame structure respectively for predetermining the natural vibration frequency of said engine on said mountings, and means coacting with the other end of said engine for limiting transverse movement of the unsupported end of the engine and adapted to limit fore and aft movement of said engine in the direction of its length.

3. A mounting for an internal combustion engine including a frame structure, means on said frame structure sustaining substantially the entire weight of said engine and oscillatively supporting the latter including yieldable supports located at one end of said engine and intermediate the ends thereof respectively, means coacting with the other end of said engine and adapted to limit transverse movement of the latter end of said engine, and resilient means coacting between said engine and frame structure for predetermining the natural vibration frequency of said engine on said mounting.

4. A mounting for an internal combustion engine including a frame structure, a pair of yieldable supports on said frame structure sustaining substantially the entire weight of said engine and oscillatively supporting the latter, one support being located at one end of said engine and the other intermediate the ends thereof, and coacting members on said frame structure and engine including opposed faces having yieldable means therebetween adapted to limit longitudinal movement of said engine and transverse movement of the unsupported end thereof respectively relative to said frame structure.

5. A mounting for an internal combustion engine including a frame structure, a pair of yieldable supports on said frame structure sustaining substantially the entire weight of said engine and oscillatively supporting the latter, one support being located at one end of said engine and the other intermediate the ends thereof, and means on said frame structure for limiting transverse movement of the other end portion of said engine and having a resilient element fixed under tension to the latter end portion of said engine and to said frame structure respectively for firmly urging said engine downwardly upon said intermediately located yielding support.

6. A mounting for an internal combustion engine including a frame structure, a pair of yieldable supports on said frame structure sustaining substantially the entire weight of said engine and oscillatively supporting the latter, one support being located at one end of said engine and the other intermediate the ends thereof, and an arm pivotally mounted on said frame structure having a collar journaled on the other end of said engine for limiting transverse movement thereof.

7. A mounting for an internal combustion engine including a frame structure, a member mounted on said frame structure adapted to resiliently support one end portion of said engine and permit it to oscillate about a substantially fixed oscillation center, resilient supporting means between said frame structure and an intermediate portion of said engine, said member and said resilient supporting means sustaining substantially the entire weight of said engine, and yieldable means on said frame structure free from the weight of said engine for limiting movement of the other end portion of said engine with respect to said frame structure in predetermined directions normal to the length of said engine.

8. A mounting for an internal combustion engine including a frame structure, a member mounted on said frame structure having a portion adapted to be oscillated about a substantially fixed oscillation point and to resiliently support the front end of said engine, a yieldable weight supporting member interposed between opposed faces on said frame structure and on a portion of said engine intermediate its front and rear ends, said yieldable member being fixed with respect to one of said faces, and yieldable means on said frame structure free from the weight of said engine and located at the rear end portion thereof for limiting transverse movement of said rear end portion with respect to said frame structure said yieldable means and yieldable weight supporting member being so constructed and arranged that the axis of oscillation of said engine passes through said oscillation center and substantially through the center of mass of said engine.

9. A mounting for an internal combustion engine including a frame structure, a member mounted on said frame structure including resilient means supporting the front end of said engine and permitting oscillation thereof about a substantially fixed oscillation center, a yieldable weight supporting member interposed between a face on said frame structure and an opposed face on a portion of said engine intermediate its front and rear ends, and coacting members on said frame structure and engine substantially free from the weight of the latter including opposed faces having yieldable means therebetween for limiting longitudinal movement of said engine and transverse movement of the rear end thereof relative to said frame structure, said yieldable weight supporting member and said coacting members being of such character and so located that the axis of oscillation of said engine passes substantially through the center of mass of the latter.

10. A mounting for an internal combustion engine including a frame structure, a member mounted on said frame structure including resilient means supporting the front end of said engine and permitting oscillation thereof about a substantially fixed oscillation center disposed at an elevation above the center of mass of said engine and substantially in alignment with the latter and with a point on the crankshaft axis at the rear end of said engine, a yieldable weight supporting member interposed between a face on said frame structure and an opposed face on a portion of said engine intermediate its front and rear ends, said yieldable member being fixed with respect to one of said faces, and yieldable means on said frame structure free from the weight of said engine and located at the rear end portion thereof for limiting transverse movement of said rear end portion with respect to said frame structure, said yieldable weight supporting member and said yieldable means being so formed and located as to define and provide an axis of oscillation for said engine which passes through said oscillation center and substantially through the center of mass of said engine.

11. A mounting for an internal combustion engine including a frame structure, a member mounted on said frame structure including resilient means supporting the front end of said engine and permitting oscillation thereof about a substantially fixed oscillation center disposed at an elevation above the center of mass of said engine and substantially in alignment with the latter and with a point on the crankshaft axis at the rear end of said engine, a yieldable weight supporting member between a face on said frame structure and an opposed face on a portion of said engine intermediate its front and rear ends, yieldable means on said frame structure free from the weight of said engine and located at the rear end portion thereof and adapted to limit transverse movement of said rear end portion with respect to said frame structure, said yieldable weight supporting member and said yieldable means being so constructed and arranged as to provide for oscillation of said engine about an axis which passes through said oscillation center and substantially through the center of mass of said engine, and means including a resilient element coacting between said engine and frame structure for maintaining the natural vibration frequency of said engine on its mounting at a selected low value.

12. A mounting for an internal combustion engine including a frame structure, a member mounted on said frame structure including means resiliently supporting the front end of said engine, a resilient support between said frame structure and an intermediate portion of said engine, said member and resilient support sustaining substantially the entire weight of said engine, yieldable means on said frame structure located at the unsupported end portion of said engine for limiting transverse movement thereof with respect to said frame structure, said member, resilient support and said resilient means being so constructed and arranged as to provide for oscillation of said engine about an axis extending substantially through the center of mass of said engine, and means including a resilient element coacting between said engine and frame structure for maintaining the natural vibration frequency of said engine on its mounting at a selected low value.

13. A mounting and internal combustion engine assembly including a frame structure, a multiple cylinder internal combustion engine, a supporting member on said frame structure having a rubber element oscillatively supporting the weight of the front end of said engine and providing a substantially fixed oscillation center therefor above the elevation of the center of mass of said engine, a rubber block disposed between said frame structure and a portion of said engine intermediate its front and rear ends and supporting substantially all the remaining weight of said engine, and yieldable means coacting with the lateral sides of the engine at the rear end thereof adapted to hold the latter against transverse movement relative to said frame structure, said supporting member, rubber block and yieldable means being so constructed and arranged as to provide for oscillation of said engine under the torque reaction impulses developed in operating the latter about an axis determined by said oscillation center and the center of mass of said engine.

14. A mounting and internal combustion engine assembly including a frame structure, a multiple cylinder internal combustion engine, a supporting member on said frame structure having a rubber element oscillatively supporting the weight at the front end of said engine and having a substantially fixed oscillation center disposed in a higher plane than the center of mass of said engine, a rubber block interposed between said frame structure and a portion of said engine intermediate its front and rear end supporting substantially all the remaining weight of said engine, and coacting members on said frame structure and engine substantially free from the weight of the latter provided with opposed faces having yieldable means therebetween for limiting longitudinal movement of said engine and transverse movement of the rear end thereof respectively relative to said frame structure, said supporting member, rubber block and said yieldable means being of such character and so arranged as to provide an axis of oscillation for said engine which passes substantially through said oscillation center and substantially through the center of mass of said engine.

15. A mounting and internal combustion engine assembly including a frame structure, a multiple cylinder internal combustion engine, a supporting member on said frame structure having a rubber element oscillatively supporting the weight at the front end of said engine and providing a substantially fixed oscillation center disposed in a higher plane than the center of mass of said engine, a rubber block interposed between said frame structure and a portion of said engine intermediate its front and rear ends and supporting substantially all the remaining weight of said engine, yieldable means coacting with the lateral sides of the engine at the rear end thereof adapted to hold the latter against transverse movement relative to said frame structure, said supporting member, rubber block and yieldable means being so constructed and arranged as to provide for oscillation of said engine assembly about an axis which passes through said oscillation center and through the center of mass of said engine assembly, and resilient means coacting between said engine and frame for controlling the natural vibration frequency of said engine.

16. A mounting and internal combustion engine assembly including a frame structure, a multiple cylinder internal combustion engine, a resilient supporting member disposed between a substantially flat face on said frame and on an opposed portion of said engine intermediate its front and rear ends, said resilient member being fixed to one of said faces, a supporting member on said frame structure at the front end of said engine including opposed arcuate faces having a rubber element interposed therebetween supporting the front end of said engine and constructed and arranged so as to provide for oscillation thereof about an oscillation center disposed in a higher plane than the center of mass of said engine and in the same longitudinal vertical plane and substantially in alignment with the center of mass and a point on the axis of said crankshaft at the rear end of said engine, and yieldable members at the rear end of said engine coacting between the lateral sides thereof and said frame structure for opposing transverse movement of the rear end of said engine.

17. A mounting and internal combustion engine assembly including a frame structure, a multiple cylinder internal combustion engine including rigidly connected longitudinally aligned crankcase, clutch and transmission housings, a pair of resilient supports on said frame structure sustaining substantially the entire weight of said engine and oscillatively supporting the latter one located at the front end of said crankcase and the other at the rear end thereof, yieldable means bearing between said frame structure and said transmission housing for holding the rear end portion of said engine against transverse movement and an element protruding from said transmission housing and cooperating with said yieldable means for limiting fore and aft movement of said engine.

18. A mounting and internal combustion engine assembly including a frame structure, a multiple cylinder internal combustion engine including rigidly associated longitudinally aligned crankcase, clutch and transmission housings, a pair of resilient supports on said frame structure containing the located between the vertical planes containing the lateral sides of said crankcase and sustaining substantially the entire weight of said engine and oscillatively supporting the latter, one of said supports being located at the front end of said crankcase and the other at the rear end thereof, and yieldable means bearing between said frame structure and the sides of said transmission housing substantially free from the weight of said engine and adapted to hold the rear end portion of said engine against transverse movement.

19. A mounting for an internal combustion engine assembly including a multiple cylinder internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of supports each including a rubber element which together sustain substantially the entire weight of said engine, one of said supports being located at the front of said engine in close proximity to its axis and the other located at the rear end of said engine and spaced from said axis, and yieldable means substantially in alignment with said axis and disposed between said frame structure and the sides of said transmission housing adapted to limit transverse movement of the rear end of said engine and said axis.

20. A mounting for an internal combustion engine assembly including a multiple cylinder internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of supports each including a rubber element which together sustain substantially the entire weight of said engine, one of said supports being located at the front of said engine in close proximity to its axis and the other located at the rear end of said engine and spaced from said axis, yieldable means substantially in alignment with said axis and disposed between said frame structure and the sides of said transmission housing adapted to limit transverse movement of the rear end of said engine and said axis, means on said transmission housing coacting with said yieldable means for limiting fore and aft movement of said engine in the direction of its length, and resilient means coacting with said engine and frame structure for predetermining the natural vibration frequency of said engine on said mountings.

21. A mounting for an engine assembly including a multiple internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of resilient supports which together sustain substantially the entire weight of said engine assembly, one of said supports being located at the front of said engine assembly and the other being located intermediate the ends thereof, and yieldable means disposed between said frame structure and side portions of said engine assembly adapted to limit transverse movement of the rear end thereof.

22. A mounting for an engine assembly including a multiple internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of resilient supports which together sustain substantially the entire weight of said engine assembly, one of said supports being located at the front of said engine assembly and the other being located intermediate the ends thereof, yieldable means disposed between said frame structure and side portions of said engine assembly adapted to limit transverse movement of the rear end of said engine assembly and axis, and means on said engine assembly coacting with said yieldable means for limiting fore and aft movement of said engine assembly in the direction of its length.

23. A mounting for an engine assembly including a multiple internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of resilient supports, one including a rubber element and together sustaining substantially the entire weight of said engine assembly, one of said supports being located at the front of said engine assembly in close proximity to said axis and the other located intermediate the ends of said engine assembly and spaced from said axis, and yieldable means substantially in alignment with said axis and disposed between said frame structure and side portions of said engine assembly adapted to limit transverse movement of the rear end of said engine unit and axis.

24. A mounting for an engine assembly including a multiple internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of resilient supports which together sustain substantially the entire weight of said engine assembly, one of said supports being located at the front of said engine assembly and the other being located intermediate the ends thereof, opposed rigid members protruding from said frame structure and engine assembly respectively extending transversely of the length of the latter, and a rubber element disposed between said rigid members and between said frame structure and registering side portions of said engine assembly for limiting transverse movement of the rear end portion of said engine assembly and fore and aft movement thereof in the direction of its length.

25. The combination of an internal combustion engine unit, a supporting structure, members coacting between said structure and unit to support the latter and so constructed and arranged that the axis of oscillatory movement of the engine unit substantially coincides with an axis extending through the center of mass of the engine unit, one of said members being located at the front of said engine unit and another intermediate the length thereof, and yieldable means disposed between said engine unit and supporting structure adapted to limit transverse movement of the rear end of said engine unit.

26. The combination of an internal combustion engine unit, supporting structure, and means for mounting said unit on said supporting structure so constructed and arranged as to mount said engine unit for oscillation about an axis extending substantially through the center of mass of said engine unit, said means including a pair of resilient members, one located at the front of said engine unit and the other intermediate its ends and which together sustain substantially the entire weight of said engine unit and yieldable means disposed between said engine unit and supporting structure adapted to limit transverse movement of the rear end portion of said engine unit.

27. In a vehicle including a chassis frame and a main drive shaft, the combination of an internal combustion engine unit having a crankshaft connected with said main drive shaft, and means on said frame supporting said engine unit and so arranged and constructed that the axis of oscillation of the engine unit substantially coincides with an axis extending forwardly from within close proximity to the forward end of said main drive shaft substantially through the center of mass of said engine unit, said means including a pair of resilient nonmetallic members, one located at the front of said engine unit and the other intermediate its ends and together sustaining substantially the entire weight of said engine, and yieldable means disposed between said chassis frame and engine unit adapted to limit transverse movement of the rear end thereof.

28. The combination of an internal combustion engine unit having a crankshaft, supporting structure, and means for mounting said unit on said supporting structure so constructed and arranged as to mount said engine unit for oscillation about a predetermined axis extending at an inclination to the axis of said crankshaft, said means including a pair of resilient members, one located at the front of said engine unit and the other intermediate its ends and together sustaining substantially the entire weight of said engine unit, and yieldable means free from the weight of said engine unit disposed between the latter and said supporting structure adapted to limit transverse movement of the rear end of said engine unit.

29. A mounting for an engine assembly including a multiple cylinder internal combustion engine having a crankshaft, rigidly connected longitudinally aligned crankcase, clutch and transmission housings, comprising a frame structure, means for oscillatively mounting said engine unit on said frame structure about a predetermined axis extending at an inclination to the axis of said crankshaft, said means comprising a pair of rubber members which together sustain substantially all of the weight of said engine assembly, one of said supports being located at the front end of said engine assembly and the other intermediate its ends, and means including rubber members substantially free from the weight of said engine assembly and disposed between side portions thereof and said frame structure adapted to limit transverse movement of said engine assembly.

30. A mounting for an internal combustion engine assembly including a multiple cylinder internal combustion engine, rigidly connected longitudinally aligned crankcase, clutch and transmission housings, comprising a frame structure, means for oscillatively mounting said engine assembly on said frame structure about an axis extending substantially through the center of mass of the engine assembly, said means comprising a pair of supports each including a resilient element which together sustain substantially the entire weight of said engine, one of said supports being located at the front of said engine in close proximity to its axis and the other located at the rear end of said engine and spaced from said axis, and means substantially in alignment with said axis coacting between said frame structure and rear end portions of said engine assembly for limiting transverse movement of the rear end thereof.

31. A mounting for an internal combustion engine including a frame structure, a pair of yieldable supports on said frame structure sustaining substantially the entire weight of said engine and oscillatively supporting the latter, and means on said frame structure for limiting transverse movement of one end portion of said engine and having a resilient element fixed under tension to the latter end portion of said engine and to said frame structure respectively for firmly urging said engine downwardly upon one of said yieldable supports.

32. A mounting for an internal combustion engine including a frame structure, a pair of yieldable supports on said frame structure sustaining substantially the entire weight of said engine and so constructed and arranged as to mount said engine unit for oscillation about an axis extending substantially through the center of mass of said engine, one support being located at one end of said engine and the other intermediate the ends thereof, and means on said frame structure for limiting transverse movement of the other end portion of said engine and having a resilient element fixed under tension to the latter end portion of said engine and to said frame structure respectively for firmly urging said engine downwardly upon said intermediately located yielding support.

33. A mounting for an internal combustion engine including a frame structure, a pair of yieldable supports on said frame structure sustaining substantially the entire weight of said engine and oscillatively supporting the latter, and an arm pivotally mounted on said frame structure having a collar journaled on one end of said engine for limiting transverse movement thereof.

34. A mounting for an internal combustion engine assembly including a frame structure, means on said frame structure sustaining substantially the entire weight of said engine assembly and oscillatively supporting the latter, said means comprising resilient supports located at the front end of said assembly and intermediate the ends thereof respectively, and means including yieldable material substantially free from the weight of said engine assembly coacting between the latter and said frame structure adapted to limit movement of the rear end of said engine in a direction normal to the length of said assembly.

35. A mounting for an internal combustion engine including a frame structure, means on said frame structure sustaining substantially the entire weight of said unit and oscillatively supporting the latter, said means including yieldable supports located at one end of said unit and intermediate the ends thereof respectively, and coacting members on said frame structure and engine including opposed faces having yieldable means therebetween adapted to limit longitudinal movement of said engine and transverse movement of the unsupported end thereof respectively relative to said frame structure.

36. A mounting for an internal combustion engine unit including a frame structure, means on said frame structure for oscillatively supporting said unit, said means comprising resilient material and being located at one end of said unit and intermediate the ends thereof respectively, and coacting members carried by said frame structure and engine unit respectively having yieldable material therebetween adapted to oppose movement of the other end of said unit in at least one direction normal to the length of said engine unit.

37. The combination of an internal combustion engine unit, a supporting structure, means coacting between said structure and unit to support the latter and so constructed and arranged that the axis of oscillatory movement of the engine unit extends forwardly from the rear end portion thereof at an inclination to the crankshaft axis of said engine unit, said means including resilient supports located at the front of said engine and intermediate the ends thereof respectively, and yieldable means coacting between said engine unit and supporting structure for limiting movement of the rear end of said engine unit.

38. The combination of an internal combustion engine unit having a crankshaft, supporting structure, and means for mounting said unit on said supporting structure so constructed and arranged as to mount said engine unit for oscillation about a predetermined axis extending at an inclination to the axis of said crankshaft, said means including resilient members located at the front and intermediate the ends of said engine unit respectively and together sustaining substantially the entire weight of said engine unit, and means including yieldable material free from the weight of said unit and coacting between the latter and said supporting structure for opposing movement of the rear end of said engine unit in predetermined directions normal to the length of said unit.

39. A mounting for an internal combustion engine unit including a frame structure means including yieldable supports on said frame structure sustaining substantially the entire weight of said engine unit and oscillatively supporting the latter, and an arm coacting between said frame structure and engine having a bearing element rotatably connected with said engine for limiting transverse movement of a portion thereof.

40. A mounting for an internal combustion engine unit including a frame structure means including yieldable supports on said frame structure sustaining substantially the entire weight of said engine unit and oscillatively supporting the latter, and means coacting between said frame structure and an end portion of said engine unit for controlling movement thereof in directions normal to the length of said unit, said means restraining transverse movement of said portion of said engine unit and substantially freely accommodating vertical movement thereof.

ROGER K. LEE.
CARROLL L. HUMPHREY.